(12) United States Patent
Weldemariam et al.

(10) Patent No.: US 11,196,551 B2
(45) Date of Patent: Dec. 7, 2021

(54) AUTOMATED TASK MANAGEMENT ON A BLOCKCHAIN BASED ON PREDICTIVE AND ANALYTICAL ANALYSIS

(71) Applicant: International Business Machines Corporation, Armonk, NY (US)

(72) Inventors: Komminist Weldemariam, Nairobi (KE); James R. Kozloski, New Fairfield, CT (US); Michael S. Gordon, Yorktown Heights, NY (US); Maja Vukovic, New York, NY (US); Elizabeth Ondula, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 16/019,630

(22) Filed: Jun. 27, 2018

(65) Prior Publication Data
US 2020/0007322 A1    Jan. 2, 2020

(51) Int. Cl.
*H04L 9/32* (2006.01)
*H04L 29/08* (2006.01)
*H04L 9/08* (2006.01)
*H04L 9/06* (2006.01)
*G06F 16/27* (2019.01)
(Continued)

(52) U.S. Cl.
CPC ........ *H04L 9/0861* (2013.01); *G06F 16/1805* (2019.01); *G06F 16/1834* (2019.01); *G06F 16/27* (2019.01); *H04L 9/0643* (2013.01); *H04L 9/3213* (2013.01); *H04L 9/3247* (2013.01); *H04L 67/306* (2013.01)

(58) Field of Classification Search
CPC ... H04L 9/0861; H04L 9/0643; H04L 9/3213; H04L 9/3247; H04L 67/306; G06F 16/27; G06F 16/1805; G06F 16/1834
See application file for complete search history.

(56) References Cited

U.S. PATENT DOCUMENTS

| 8,631,419 | B2 | 1/2014 | Horvitz et al. |
| 10,554,654 | B1 * | 2/2020 | Ramanathan ......... G06Q 20/40 |

(Continued)

FOREIGN PATENT DOCUMENTS

WO    2017044554 A1    3/2017

OTHER PUBLICATIONS

Alphand,Amoretti,claeys,Asta, Duda,Ferrari,Rousseau,Touracheau,Veltri,Zanichelli, IoT Chain:A Blockchain Security Architecture for Internet of Things, Feb. 9, 2018, IEEE (Year: 2018).*

(Continued)

*Primary Examiner* — Arezoo Sherkat

(57) ABSTRACT

An example operation may include one or more of receiving user profile identification data associated with a user profile, creating a smart contract on a blockchain with the user profile identification data, validating an identity of the user profile based on the user profile identification data, performing a predictive analysis by the smart contract to determine one or more future tasks to be performed by a user device associated with the user profile, generating one or more tokens associated with the user profile, the one or more tokens include access rights for the user device to perform the one or more future tasks, and storing the one or more tokens in the blockchain.

17 Claims, 12 Drawing Sheets

(51) Int. Cl.
    *G06F 16/18*     (2019.01)
    *G06F 16/182*     (2019.01)

(56) References Cited

U.S. PATENT DOCUMENTS

| | | |
|---|---|---|
| 2014/0324469 A1 | 10/2014 | Reiner |
| 2016/0330034 A1 | 11/2016 | Back et al. |
| 2017/0011460 A1 | 1/2017 | Molinari et al. |
| 2017/0103468 A1 | 4/2017 | Orsini et al. |
| 2017/0147808 A1 | 5/2017 | Kravitz |
| 2017/0352116 A1 | 12/2017 | Pierce et al. |
| 2018/0165758 A1* | 6/2018 | Saxena ............... G06Q 30/02 |
| 2018/0302222 A1* | 10/2018 | Agrawal ............. G06F 21/604 |
| 2019/0087446 A1* | 3/2019 | Sharma ............... G06Q 20/382 |
| 2019/0236559 A1* | 8/2019 | Padmanabhan ....... G06F 21/64 |
| 2019/0236598 A1* | 8/2019 | Padmanabhan .... G06Q 20/4016 |
| 2019/0268332 A1* | 8/2019 | Wang ................. H04L 9/3231 |
| 2019/0294817 A1* | 9/2019 | Hennebert ......... G06F 16/1824 |

OTHER PUBLICATIONS

Fremantle, Aziz, OAuthing: Privacy-enhancing Federation for the Internet of Things, Nov. 2016, University of Portsmouth, School of computing, 2016 Cloudification of Internet of Things (CIoT), pp. 1-6 (Year: 2016).*

Lamela et al., Scripting smart contracts for distributed ledger technology, 2017 (see p. 1). https://eprint.iacr.org/2016/1156.pdf.

* cited by examiner

AUTOMATED TASK MANAGEMENT ON A BLOCKCHAIN BASED ON PREDICTIVE AND ANALYTICAL ANALYSIS

TECHNICAL FIELD

This application generally relates to task management on a blockchain, and more specifically to performing predictive and analytical analysis on known data in a blockchain to provide automated task management services and to provide automated task management on a blockchain based on predictive and analytical analysis.

BACKGROUND

A blockchain may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Blockchain is a distributed database that maintains a continuously-growing list of records in the blockchain blocks, which are secured from tampering and revision due to their immutable properties. Each block contains a timestamp and a link to a previous block. Blockchain can be used to hold, track, transfer and verify information. Since blockchain is a distributed system, before adding a transaction to the blockchain ledger, all peers need to reach a consensus status.

In today's smart office environment, a user and the user's profile have to be authorized to be granted access to the office premises or to a building using one or more authorization modes, such as a fingerprint, access badge, tokens, iris scan, face detection, etc. Once the user has entered into the office environment, he/she may need to perform certain tasks that may require the user to re-authenticate prior to performing the task. Such re-authentication is followed by checking certain access control rights against the user's profile. Examples of tasks include, for example, printing/scanning a document, making a video/conference call, accessing restricted areas, such as data centers, safe zones, laboratories, etc. The access controls are based on policy or rule specifications which are implemented and configured according to the user role for the specified resources, including computing and communication resources. The 'smart' office environment is setup for application use for scheduling desk use and meeting rooms, where the audio/visual screens work seamlessly with a user's registered device. Also, desk or room sensors may track usage to monitor efficiency. Other control functions in the smart office may provide the ability to personalize temperature and light settings, that adjust automatically according to weather, occupancy, and user preferences, etc.

Some challenges which exist in the everyday smart office environment may include requiring the user to authenticate and authorize themselves to obtain access to those resources (e.g., swipe a badge at the printer each time the user prints a document). This constant authorization/re-authorization is time consuming, cumbersome, and inefficient. Also, the user may simply use someone else's identity to access a device, or someone else may assist the user to obtain access by using another's ID badge, etc., which, in turn, violates or circumvents the access control specifications and requirements.

A system used for authorizing and authenticating a user can be forged or modified as the systems are mostly centrally controlled by an administrator or a group of administrators. The overall user experience can easily be degraded, which will defeat the whole purpose of a smart office concept. The concerns become even more difficult in multi-tenant office buildings, where all of the tenants have their own interests and priorities, which makes it difficult for security and facility managers to effectively manage security and resource access and allocation.

In another specific example, a daycare service may be setup to manage the pick-up/drop-off of children by multiple caregivers or assigned family members over time. Each time there is a slight change, the parent may be required to sign forms and authorize the new persons to pick-up the child (e.g., if the child has a playdate with another classmate after school, or if grandparents are in town, etc.). This type of system may be easily hacked, forms and signatures can be forged, etc., as the management of this facility is also controlled centrally. Furthermore, to enhance security at daycare centers, an administer must review the forms and ask for identification to ensure the person picking-up the children matches the name on the authorization forms. The security concerns and work required to provide authentication is not necessarily optimized by smart environment upgrades, since the more automation processes which are adopted leads to more errors and security loopholes.

SUMMARY

One example embodiment may provide a method that includes one or more of receiving user profile identification data associated with a user profile, creating a smart contract including the user profile identification data on a blockchain, validating an identity of the user profile based on the user profile identification data, generating one or more tokens associated with the user profile, the one or more tokens include access rights for the user profile to perform one or more tasks, and storing the one or more tokens in the blockchain.

Another example embodiment may include a method that includes one or more of receiving user profile identification data associated with a user profile, creating a smart contract on a blockchain comprising the user profile identification data, validating an identity of the user profile based on the user profile identification data, performing a predictive analysis by the smart contract to determine one or more future tasks to be performed by a user device associated with the user profile, generating one or more tokens associated with the user profile, wherein the one or more tokens include access rights for the user device to perform the one or more future tasks, and storing the one or more tokens in the blockchain.

Another example embodiment may include a system that includes a user device, and a computing node configured to receive user profile identification data associated with a user profile, create a smart contract on a blockchain comprising the user profile identification data, validate an identity of the user profile based on the user profile identification data, perform a predictive analysis by the smart contract to determine one or more future tasks to be performed by the user device associated with the user profile, generate one or more tokens associated with the user profile, wherein the one or more tokens comprise access rights for the user device to perform the one or more future tasks, and store the one or more tokens in the blockchain.

Still another example embodiment may include a non-transitory computer readable storage medium configured to store instructions that when executed cause a processor to perform one or more of receiving user profile identification data associated with a user profile, creating a smart contract on a blockchain comprising the user profile identification data, validating an identity of the user profile based on the user profile identification data, performing a predictive analysis by the smart contract to determine one or more future tasks to be performed by a user device associated with the user profile, generating one or more tokens associated with the user profile, wherein the one or more tokens comprise access rights for the user device to perform the one or more future tasks, and storing the one or more tokens in the blockchain.

DETAILED DESCRIPTION

Figure 1A:
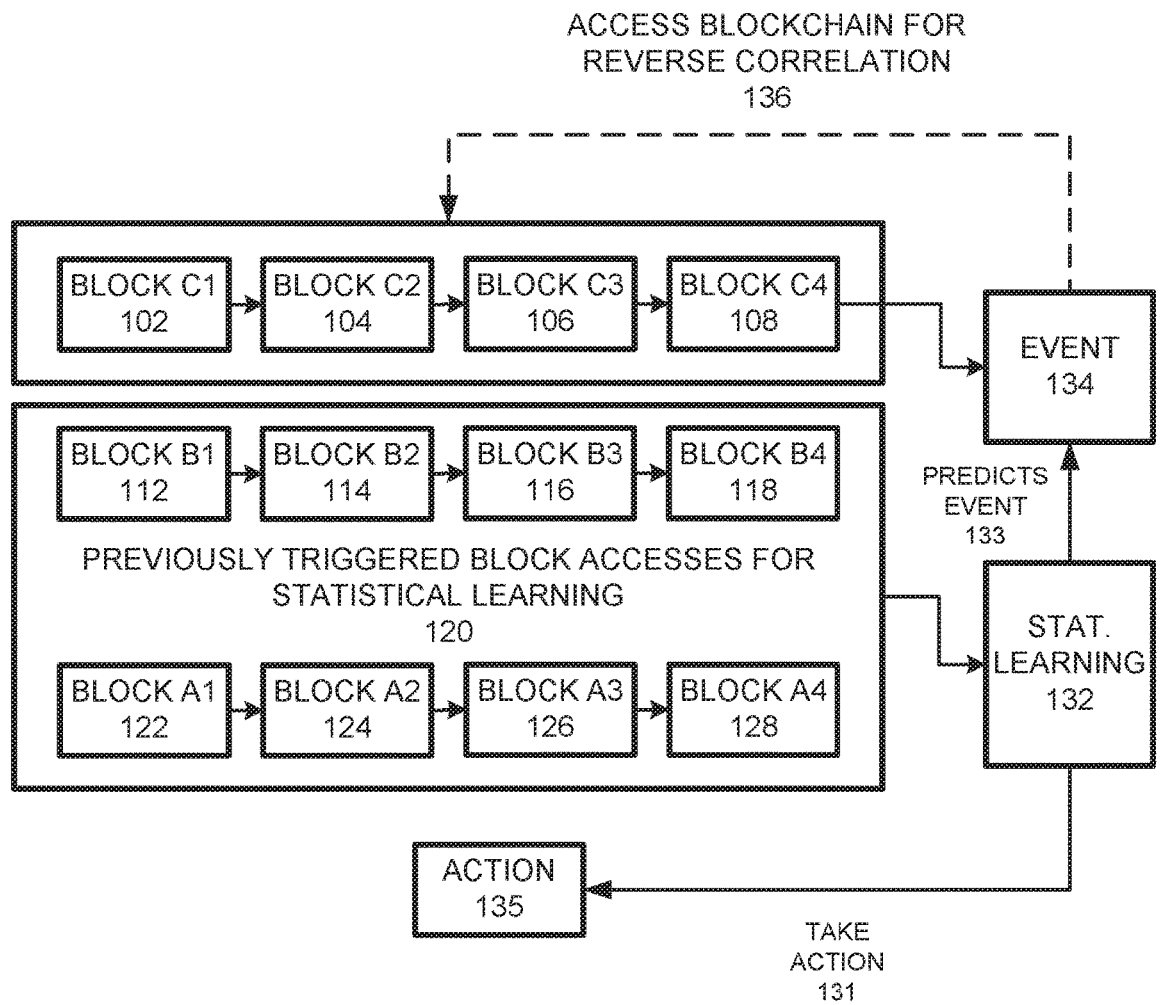
FIG. 1A illustrates a logic diagram of a blockchain learning configuration for predictive task management, according to example embodiments.

It will be readily understood that the instant components, as generally described and illustrated in the figures herein, may be arranged and designed in a wide variety of different configurations. Thus, the detailed description of the embodiments of at least one of a method, an apparatus, a non-transitory computer readable medium and a system, as represented in the associated figures and description, is not intended to limit the scope of the application, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of messages or network data, such as, packet, frame, datagram, etc. Furthermore, while certain types of messages, signaling and protocols may be depicted in exemplary embodiments they are not limited to a certain type of message, signaling or protocol.

Example embodiments provide methods, devices, networks and/or systems, which support a blockchain distributed system with selective peer management procedures. A blockchain is a distributed system which includes multiple nodes that communicate with each other. A blockchain operates programs referred to chaincodes (one way of implementing a smart contract logic), and holds state and ledger data, and executes transactions. Some transactions are operations invoked on the chaincode. In general, blockchain transactions typically must be "endorsed" by certain blockchain members and only endorsed transactions may be committed to the blockhcain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Example embodiments provide a method, device, system and computer platform for generating and interpreting context-aware tokens to manage and facilitate user tasks based on prediction, situational awareness, and contextual analysis in a blockchain implementation. Also, example embodiments also provide configuring smart contracts on a blockchain based on context and specifications related to a user, task, resource, service, etc., and predicting the user's next tasks, or a group of user tasks, for a specified time period 'T', and determining a set of user tokens associated with the predicted tasks and context, configuring one or more sensors and one or more devices at a service point (e.g., entrance to a building), and facilitating and verifying the user's next task(s), (e.g., printing a document, logging into a computer, picking up a child from a daycare center), at the service point.

Secure facilitation of tasks may be provided by intelligent predictive analysis in conjunction with references to blockchain stored data. The use and access to resources of a current task or future tasks may be identified in connection with current and future authorization and authentication events. The information identified in the predictive analysis may be identified from previously stored blockchain transactions identifying the user profile, user device, other devices used, location information, schedule information, etc. The task scheduling events may be based on predictions, situational awareness, contextual analysis, and other information identified from the blockchain and those transactions of previous engagements. The task management configurations may reduce risks, costs, and damages due to violations of authorized activities. Other configurations may include integration with existing sensors (i.e., access sensors of doors), devices and authentication and authorization workflow systems.

User's may be authorized to access an office space or a building using one or more modes of authorization, such as fingerprints, access badges, tokens, iris detection, facial detection, etc. Once the user has entered the office environment, he/she may need to perform certain tasks that may require re-authentication prior to performing the task. Such re-authentication is followed by checking certain access control rights against the user's profile and the user's device used to perform such access. Examples of tasks may include but are not limited to printing/scanning a document, making a video/conference call, accessing restricted areas, such as data centers, safe zones, laboratories, etc.

One example embodiment may provide generating and interpreting context-aware tokens to manage and facilitate user tasks based on predictions, situational awareness, contextual analysis, and references to blockchain data. Also, configuring smart contracts on the blockchain based on the identified contexts and required specifications may provide a way to predict the user's next tasks, or a group of user's next tasks, for a specified time period 'T'. One approach may include determining a set of user tokens associated with the predicted user 'next' tasks and contexts, configuring one or more sensors and/or devices at a service point (e.g., entrance to a daycare, building, secure room, etc.), and facilitating and verifying the user's next tasks (e.g., picking up a child from the daycare, entering the secure room) at the service point (e.g., entrance).

In one example, the blockchain is used to create a tamper-proof record and one or more smart contracts may be created to monitor and interpret the tokens (e.g., a QR code or related pattern) and verify whether or not the user tokens are valid for the task specification. For example, a user may present a QR code token or related code at a daycare center door reader sensor interface. The token is then implemented in a blockchain service and the user then gains access if the identity is properly authenticated. The blockchain service application invokes the one or more smart contracts associated with the expected tasks to validate the tasks and confirm, with stored specifications, and to determine if a user is authorized for that task at that service point. Also, the service application may determine the specific actions that the user, or users, should perform at a specified time period at that service point, for example, a caregiver is granted approval to pick-up kids of another parent, etc., in a particular time window 'T'. The service can provide one-time access, access for a limited period of time, or permanent access as the situation warrants. This approach also permits for users to subcontract authorizations to third parties. For instance, when a parent cannot pick up a child at daycare, a subcontracted party identified in the blockchain as a visiting parent may be identified and enabled to pick-up the child instead of the originally registered party. The smart contract may be made immediately available to the authentication system, in this example, at the daycare center, which can perform a check that the identified parties include the registered parent, and that the subcontract includes terms the daycare requires prior to authorization being granted. The smart contract can be formed based on identified tasks, changes from the predictive analysis and/or any necessary actions not previously identified in an existing smart contract. Changes to access/tokens may be included in a new smart contract which can be written to the blockchain to overwrite an existing smart contract.

In operation, completion information for a particular action or event is provided to the blockchain for verification and commitment. The smart contract(s) and the consensus protocol in the blockchain service may determine a level of access control (e.g., authorization and authentication) for the user for each predicted next user task. The smart contract on the blockchain service then may be configured based on the chaincode to send tokens for the user devices to use, based on the level of participation required. As an example, in the office environment, once the user profile is granted access to a building or facility, he/she can print or scan documents on approved scanners/printers based on authorization through a passcode or token submitted from their user device(s).

The management and facilitation of user tasks, via the blockchain service, can further be enhanced by configuring blockchain-enabled sensors at a service point (e.g., entrance to an office or daycare center). Other devices, such as computing and/or communication devices, a mobile device, a baby pacifier device with embedded functionality, a smart device which uses WIFI and/or BLUETOOTH to control other devices, may also be used to enable access and control functions. For example, by learning certain information and storing the various user profile data, and a level of participation for a particular task, the control features may be enabled to provide access and predictive functions for future tasks. The collected information may be used to generate and validate tokens and tasks, and to learn those features which are useful for for an individual or groups of individuals. The identified features may be used to generate a token/task pair.

The blockchain may be used to support a way to implement smart contracts to generate, manage, and monitor tasks each with one or more specifications and tokens associated with the tasks, resources, and services for a temporary time duration. Additional features may be used to facilitate the execution of the user tasks, as well as to provide a trusted consideration for the distributed stakeholders, such as in a workplace, or shared space, facility and/or for security managers, service providers, daycares, schools, etc. The immutable records of the blockchain are managed by the blockchain system network to reduce the likelihood of tampering or forging the records.

A tamper-proof record may include tasks that are assigned to each resource, a time stamp, context information, a plurality of verified task templates, with associated workflows for a task template, information documenting that the tokens have already been "used" or "not used" by a user, the time and date that the task is executed by the user, the time and date that the tasks are executed by user groups, and other data and information can also be recorded including user specific data, such as user identity data including but not limited to biometric data fingerprints, iris scans, face scans, voice samples, profile information, mobility data, documents, such as birth certificates, at least one government approved ID, passports, driver's licenses, etc. Other information maintained by the blockchain system resources includes devices accessible to a user profile, such as a printer, scanner, room access, projectors, TV monitors, phones, smartphones, etc. Examples of service contexts also stored in the blockchain may include a service context, such as a child feeding context, access control policies associated with a user profile, resources, and services, for instance, providing access to certain printers for a given class of employees, etc.

The context can be related to a user context, task context, resource context, and/or service context or a combination of those contexts. A context can be explicit or implicit. An explicit context can used as part of a task specification and/or configuration. An implicit context can be identified via machine learning techniques from data analysis. For example, a user context can be based on whether a user is a participant in or is operating a meeting and/or via an email interrogating procedure that searches for keywords to indicate that a recipient might need access to a scanner/copier, etc. In this example, the user context can be learned from the user interaction data, context analysis and/or instrumentation of the user activity can provide the user context. The current context can be provided as content with regard to the user's needs (e.g., printer need, server needs, secure site needs, cloud needs, etc.) and preferences, inferred from previous interactions and context information, etc. Another example of a user context may be a user registration, which can be associated with user registration smart contracts, which is configured to create a digital identity of the user profile. Further examples of contexts may provide accessing and entering a child care center to pick-up a child from a daycare at a location accessing a printer "inside a secured room", accessing ATM machines "nearby a busy restaurant", etc.

One example method of configuring the one or more smart contracts is context and task-dependent. The context may be related to the user, task, resource, and/or service. For the user context (e.g., a user registration context), associated user registration smart contracts are created and configured to create a first digital identity of the user profile. For example, upon receiving user data (e.g., fingerprint, iris scan, face, demographic data, one or more documents, etc.), the corresponding hash value may be created and encrypted. The smart contract may also generate a transaction based on the computed hashes, including uniform resource locations (URLs) where the encrypted documents are stored, and may also include relevant events and metadata associated with each instance of user data. A transaction may be transmitted to one of the blockchain nodes for validity checks using registration smart contracts, after a validity check has been performed, and the <hash, URL, events> tuples may then be committed to the shared ledger of the blockchain.

Once the block transaction commitment has been completed, the blockchain generates the digital identity of the user by creating a temporary or permanent assignment to a first set of user tokens associated with the user that may be used in a subsequent user task. The user data, user identity, and the first set of user tokens may further be updated or changed based on various conditions, such as based on the user desire (e.g., storing user voice samples, profile information, mobility data, etc.), task specifications or requirements, and/or service requirements (e.g., picking up a child from a daycare, accessing a printer, ATM machine access, etc.).

In one example, a method of predicting the user's next tasks is based on analyzing historical and/or future user calendar entries associated with a user profile to determine the need for access rights required and a level of a certain resource for a specified time period. By way of example, the system application predicts the user's next task(s) related to access to a laboratory, conference room, and resources such as a projector, since the calendar entry might indicate a user's desire to perform an experiment. Other attributes identified may indicate a desire to host a meeting or project for a report at the meeting. The method of predicting the user's next tasks further takes into consideration the user's state and context that may be learned by determining whether the user is a participant in the meeting or is actually the leader (i.e., leader context) of the meeting. Other examples include processing email content of the user by searching for keywords to indicate that a recipient might need access to a scanner/copier, etc. If necessary, a process for predicting a need for resources may include determining patterns of previous user usages. For example, if a user is identified by a statement, such as "Mike likes to send things to the printer at night and access the printer when he gets to work in the morning", or "Joe usually projects a presentation at meetings where he is a participant", the information may be extracted from an information source and used to generate a token based on the context identified. Such a method of predicting patterns of usage and next tasks may also use reverse correlation procedures.

In another example, predictive analytics, such as noise tolerant time-varying graphs, may be used by taking into account a social network of the user to predict the possible actions users may be taking (e.g. driving on the way to pick up a child, being out of town, on a business trip with colleagues, etc.). For example, during the summer, grandparents may be visiting and may take the kids to summer camp and perform the child pick-up rather than the parents who usually take the kids and pick them up from summer camp. Similarly, on certain weekdays, as observed in a calendar or in a social media communication, the father has late evening meetings and cannot pick-up the kids from school. Another example could be when the current nanny is unavailable (sick), and a replacement will be performing the pick-up, a corresponding token may be created to accommodate this future event/task, linked to a known device and used to perform the task. This function may also enable assistance in cases where child-custody rights are involved, and the children may have multiple guardians, where one parent has access to the children on given days.

FIG. 1A illustrates a logic diagram of a blockchain learning configuration for predictive task management, according to example embodiments. Referring to FIG. 1A, the prediction analytics may be based on the blockchain analytic data. For example, in the example blockchain network configuration 100A, by entering user profile related actions into the blockchain for reverse correlation 136, a specific authentication event 134, requiring accurate prediction in order to take action and generate appropriate tokens and facilitate user tasks automatically, may then trigger access to and analysis of the blockchain 120 retrospectively. The selective access of blocks 112-118 and 122-128 provides for continuous tracking of all user actions and maintains privacy such that only those actions are accessed leading up to a specific action event 134, which may be predicted as a next user action/task pertinent to an authentication event thus requiring an access token prior to obtaining access to certain resources.

The reverse correlation 136 is a narrow description of a broader set of statistical techniques that might be applied during the blockchain access operations. For example, a principal component analysis, singular value decomposition, deep learning, long-short term memory based sequence learning, etc., are techniques which may be used during a learning process 132 to predict events 133 based on the blockchain data, which may include the blocks 102-108 associated with the current event 134, and blocks 112-118 and 122-128 associated with previous events. As a result, the next task/action 135 may be identified and taken 131 into consideration for future token generation.

In a similar manner, the user's next tasks can be cognitively inferred historically by using specific activities performed by the user or a group of users. As an example, a user may usually walk to the printer immediately after entering his office building at a main entrance at 8:15 am on weekdays. Using this knowledge base gleaned from the blockchain stored task and used token information, this information can be used to verify current or future task(s) in a more focused manner. The actions normally taken by the user and associated with the user profile (i.e., user profile retrieved for access, printing, computer login, etc.), can then lead to predicted tasks being identified, tokens being created, and blockchain transactions being created to reflect those future events.

In another example, configuring the user's devices (e.g., mobile phone, smartwatch, smartphone) and applications, (e.g., social network applications, messaging applications, location or direction applications) with one or more sensors to detect a user task from a sequence of actions or activities and/or a change in the task learned when the user device and or application is being used, may be performed to enable the user device as the token using device or the access device used at the access points. The detected user's next tasks may further be validated using the one or more configured smart contracts on the blockchain. According to example embodiments, the smart contract may include logic agreed upon by members of the blockchain network, which is implemented in one or more chaincodes to validate transactions associated with the detected next tasks. A chaincode is an executable smart contract that is distributed across blockchain nodes in the network and which enables interaction with that network's shared ledger. A chaincode or generally smart contract can be written in in standard programming languages (e.g., GO, JAVA, etc.) to implement a prescribed interface. The smart contract operates in a secured environment such as a secure DOCKER container isolated from the endorsing peer process and operates to initialize and manage a ledger state through transactions submitted by applications (e.g., by task management applications). A state created by a chaincode is assigned exclusively to that chaincode and is not accessed directly by another chaincode. However, within the same network, given the appropriate permission, a chaincode may invoke another chaincode to access its state.

The method of validating the detected user's next tasks can be accomplished by checking historical user generated and/or executed task blocks on the blockchain. If necessary, a plurality of templates of user tasks with associated workflows can be generated and stored on the blockchain. By identifying the user profile "digital" activity patterns associated with the identified tasks, an estimation of the user's next tasks that may involve additional "digital" actions and may be based on "physical" and "digital" activity patterns (e.g., walking to the printer, open/enter a restricted area, in time 'T' the user establishing a phone/video conference, etc.). Digital activity patterns may also be reduced to a cluster to further authenticate the individual's identity, assigning the individual user profile to a group of users and/or validating the user profile as a party to a contract. The methods for validating the inferred or learned user's next tasks include using smart contract templates stored on the blockchain, storing the validated user's next tasks on the blockchain as evidence for future use, analyzing the historical blockchain block references, analyzing the historical tasks of the user in an effort to identify patterns of usage which are associated with a certain risk.

Templates represent an abstraction of generic entities related to tasks, chaincodes, workflows, etc. For example, a generic template may be specified for registering (e.g., using biometrics, tokens, user-passwords, patterns, etc.) a user without providing the exact implementation of inputs and outputs for the registration process. Then, the user will be instantiated based on a specialized implementation of the user registration and identification using a certain approach, such as fingerprinting, etc. An example of a generic 'SampleUserDataType.cc' template in chaincode may provide:

include configuring a blockchain-enabled sensor at the entrance of a daycare center to link to the blockchain used by the user profile associated with the user's mobile device, configuring the device used at the daycare center via the administrator to confirm the validity, such as a <tokens,

```
import (
    "fmt"
)
type UserData struct {
    UserName string 'json:"userName,omitempty"'
    UserAddress string 'json:"userAddress,omitempty"'
    DocHashList [ ]string 'json:"docHashList,omitempty,omitempty"'
    DocumentAttachment [ ]byte 'json:"documentAttachment,omitempty"'
}
// Validates data checking for empty necessary fields
func IsValidUser(data D, argsJson string)(bool,error){
    //Create access specific business logic if necessary
    return true,nil
}
func SpecialWorkflowData(data D,argsJson string)([ ]byte,error){
    //Create data, can be a document, specific business logic
    return
[ ]byte("\t[testdata/specialworkflowdata]\t"+"SpecialWorkflowData"),nil
}
// This will be wrapped around the operations IsValidUser and GetData
func QueryData(functionName string, argsJson string, data D)([ ]byte,error){
    fmt.Printf("In Query Data\n")
    if(functionName == "IsValidUser"){
        status,err := IsValidUser(D,argsJson)
        fmt.Printf("%v – %v\n",status,err)
        var returnJson string
        return
[ ]byte(returnJson),fmt.Errorf("\t[sampleuserdata/querydata]\t"+err.Error( ))
    } else {
        return nil,
fmt.Errorf("\t[sampleuserdata/querydata]\t"+"Method Name: Invalid")
    }
}
// WorkflowData carries out data specific processing, if any.
func WorkflowData(functionName string, argsJson string, data D)([ ]byte,error) {
    fmt.Printf("In WorkflowData\n")
    if(functionName == "SpecialWorkflowData") {
        return SpecialProcessDocument(doc,argsJson)
    } else {
        return nil,
fmt.Errorf("\t[sampleuserdata/workflowdata]\t"+"MethodName: Invalid")
    }
}.
```

This template chaincode for certain user data can be instantiated in any implementation of the user data (e.g., biometric data, passport document, etc.). The prediction of the user's next tasks, or a group of next tasks, further causes triggering of the secondary token generation process. A token generation module may select relevant contexts (e.g., access control specifications) from the blockchain, which are associated with the predicted user's next tasks. The resource and service contexts may be used to generate one or more tokens associated with the specific individual or individuals who have historically executed the same task, such as evidence in the blockchain indicated the user profile was linked to a logged child pick-up event at a daycare center using tokens stored in the blockchain to create a QR code displayed on the user device to access a code reader interface at the facility.

Additional operations may include automatically verifying the generated tokens in association with the predicted user's next tasks at a point of service (e.g., at a door entrance, at a scanning location, at a daycare/school). As an example embodiment, a mechanism and method may task> pair. In one specific example, a baby pacifier may have smart features, such as a sensor that is enabled to identify a child's temperature and transmit the information to a receiving device to log the child's status in the blockchain. In this example, a computing device, such as a smart device configured to communicate with other communication enabled devices may receive and store information in the blockchain to verify a <token, task> pair.

The generation of a token is performed for several reasons, such as to improve security, convenience, efficiency, etc. A token is used each time a transaction is submitted to the blockchain for validation. A token can be associated with a user (e.g., identity of the user), task/service (e.g., a printing task, accessing a door, authentication service, authorization service, etc.) A token is also temporal and has a certain scope, for example, an identification token is generated to an employee when they enter an office building and will be valid as long as the employee remains in the building or in some specifically defined area. The scope of the token is only valid for user identification. In one example, the system application may predict a user's next task, such as opening a conference call in 30 minutes in a particular board room, based on the analysis of the historical calendar entries etc. The system may also infer that the user needs to access the video conference facilities, which may require an elevated resource-service confidentiality requirement obtained from the specification of the resource stored in the ledger. This may invoke specifying a needed secondary token. In one implementation, the system then generates the secondary token (e.g., voice recognition) based the primary token, service/task/resource requirement, etc. Both tokens along with other metadata (e.g., resource ID, service ID, time, etc.) will be part of the transaction to be sent and validated by the task management blockchain service since, in this case, both tokens are required for the single task.

Figure 1B:
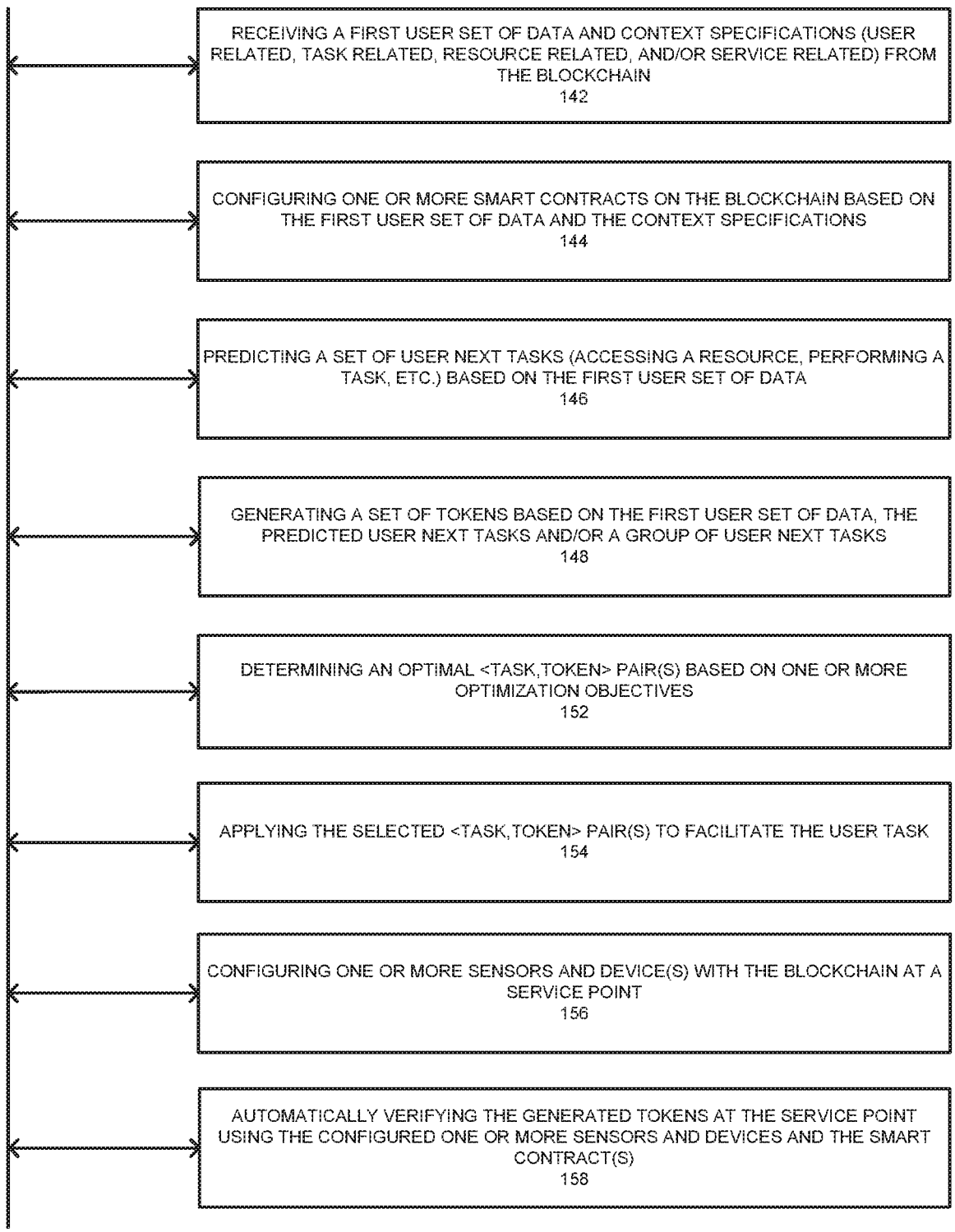
FIG. 1B illustrates a flow diagram of an example method of performing blockchain enhanced task management procedures, according to example embodiments.

FIG. 1B illustrates a flow diagram of an example method of performing blockchain enhanced task management procedures, according to example embodiments. Referring to FIG. 1B, one example process 100B may provide receiving, by the blockchain application system, user identification data, as a first set of user data 142 (e.g., biometric data, voice sample, profile information, user mobility data, historical user behavior data, etc.) from a blockchain network, configuring one or more smart contracts on the blockchain, based on the user data received and the context specifications 144, and validating, by the system, the identity of the user based the user data and the configured smart contracts. The context specifications represent the "explicit" context information related to the user, resource, task/service, etc. The specification of such contexts can be part of the logic used in the smart contracts.

A set of user next tasks may be identified and predicted 146 from the known information in the blockchain. A first set of tokens may be generated 148, which are associated with the user profile and which are going to be used in subsequent user tasks as a result of a successful validation of the user's identity. The prediction may be to identify a set of the user's next tasks, such as accessing a resource, printer, scanner, conference call, accessing a restricted area, etc. The process includes determining the user's context (e.g., detecting a user is about to scan and send a document within two minutes, upcoming mandatory conference call in five minutes, etc.) based on the first user's data and/or the user's calendar.

Continuing with the same example, additional operations may include identifying resources, including computing and communication resources, associated with the predicted set next tasks and any subcontracts related to these predicted next tasks, selecting relevant access control specifications from the blockchain based on the identified resources and subcontracts, generating a secondary set of tokens based on the first user's data, the predicted user's next tasks, the identified access control specifications, the identified resources, and/or the determined user's context, determining optimal <task, token> pairs 152 based on one or more optimization objectives, which may include, for example, minimizing a warm-up time for a scanner based on the expected time a user will need to perform their next expected scanning task. An example of a subcontract can be a third party individual(s) or company contracted with the primary task owner (e.g., a parent picking a child from a daycare) to perform the task. In this example, the ledger has already stored such contractual agreements between the owner, subcontractor, etc., such that upon a task execution, such a contractual agreement will be validated by the authorized service provider entity/agent (e.g., personnel at the daycare or an artificial intelligent agent) by querying the blockchain system. An event can be automatically sent to the primary owner to inform/confirm such a transaction.

Optimization may include energy optimization, reminder optimization to ensure timeliness with appointments, location routing optimization to save fuel, avoid rush hour, etc. Further operations may include applying the selected <task, token> pairs to facilitate user tasks 154 (e.g., providing access to resources). In the actual working environments, additional operations may include configuring one or more sensors 156 and devices with the blockchain to be accessible at the identified service points (e.g., secure doors, entrances, etc.), and automatically verifying the tokens at the service points based on the sensors and the devices and the smart contracts 158. User profile assigned tasks and next tasks may be based on a specified time period "T". The one or more smart contracts may be created to help monitor and interpret the tokens (e.g., a QR code or related pattern), tasks, and subcontracts. When performing the predictive analysis, analyzing historical user calendar entries may be performed to determine a need and access level for a certain resource and/or service for specified time period. One example of determining patterns of previous usages may be identified from a user's actions, such as printing documents at night and accessing the printer in the morning to obtain the papers. By analyzing block data in the blockchain, continuous tracking of all user actions may be performed. Determining a context and level of access control for each predicted user next task may also be performed to properly prepare the tokens and next task assumptions. When generating the tokens, certain operations may include receiving the predicted user next tasks, or group next tasks, and determining relevant contexts, including resource and service contexts, from the blockchain associated with the predicted next tasks.

Figure 2A:
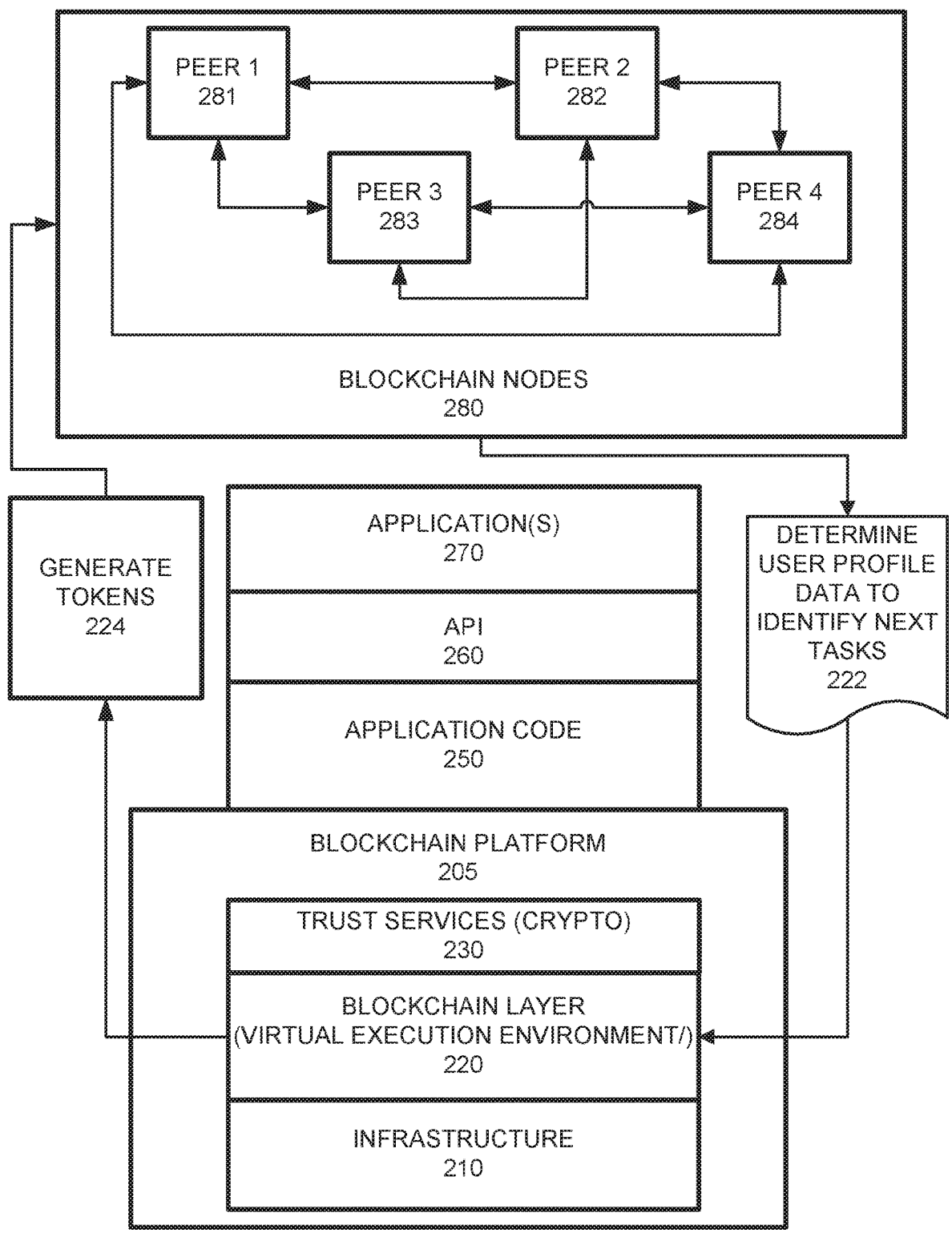
FIG. 2A illustrates an example peer node blockchain architecture configuration for a task management scenario, according to example embodiments.

FIG. 2A illustrates a blockchain system architecture configuration 200A, according to example embodiments. Referring to FIG. 2A, blockchain architecture 200A may include certain blockchain elements, for example, a group 280 of blockchain nodes 281-284 which participate in blockchain transaction addition and validation process (consensus). One or more of the blockchain nodes 281-284 may endorse transactions and one or more blockchain nodes 281-284 may provide an ordering service for all blockchain nodes in the architecture 200A. A blockchain node may initiate a blockchain authentication and attempt to write to a blockchain immutable ledger stored in blockchain layer 220, a copy of which may also be stored on the underpinning physical infrastructure 210. The blockchain configuration may include one or more applications 270, which are linked to application programming interfaces (APIs) 260 to access and execute stored program/application code 250 (e.g., chaincode, smart contracts, etc.), which can be created according to a customized configuration sought by participants and can maintain their own state, control their own assets, and receive external information.

The blockchain platform 205 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 220 may expose an interface that provides access to the virtual execution environment necessary to process the program code and engage the physical infrastructure 210. Cryptographic trust services 230 may be used to verify transactions such as asset exchange transactions and keep information private.

The blockchain architecture configuration of FIG. 2A may process and execute program/application code 250 via one or more interfaces exposed, and services provided, by blockchain platform 205. The code 250 may control blockchain assets. For example, the code 250 can store and transfer data, and may be executed by nodes 281-284 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. In one example, a user profile may be identified and processed by one or more processing entities (e.g., virtual machines) included in the blockchain layer 220. The result may include identifying tasks 222 and generating tokens 224 to be used when processing blockchain tasks/events.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. In operation, the chaincode may receive a hash and retrieve from the blockchain a hash associated with the data template created by a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
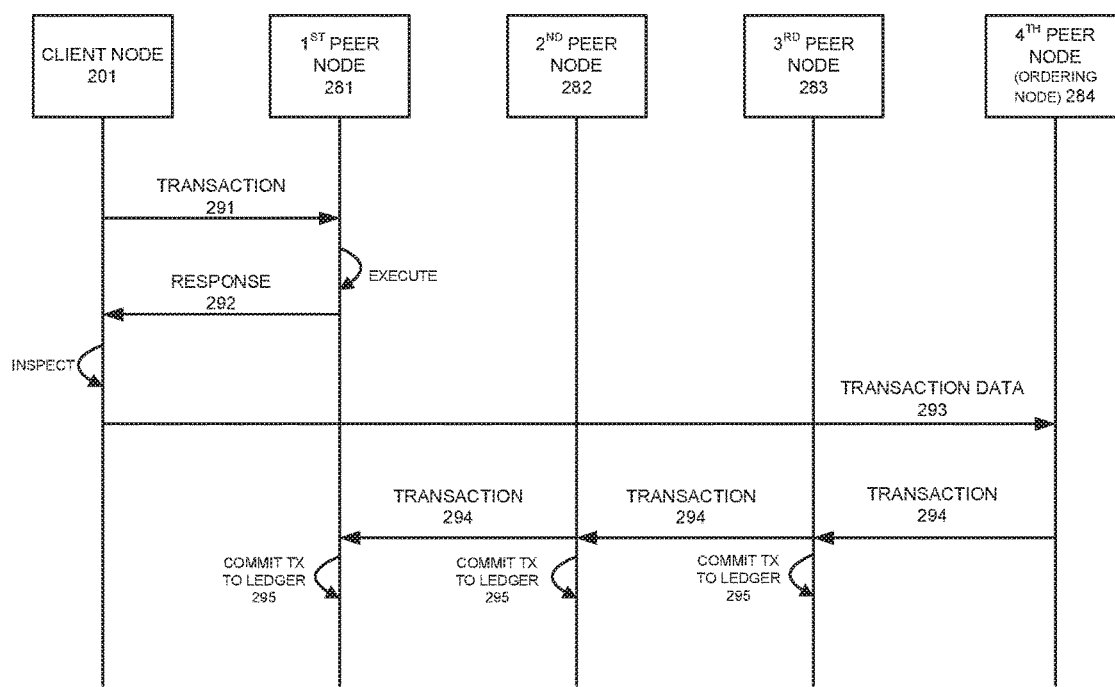
FIG. 2B illustrates an example peer node blockchain configuration, according to example embodiments.

FIG. 2B illustrates an example of a transactional flow 200B between nodes of the blockchain in accordance with an example embodiment. Referring to FIG. 2B, the transaction flow may include a transaction proposal 291 sent by an application client node 201 to an endorsing peer node 281. The endorsing peer 281 may verify the client signature and execute a chaincode function to simulate the transaction. The output may include the chaincode results, a set of key/value versions that were read in the chaincode (read set), and the set of keys/values that were written in chaincode (write set). The proposal response 292 is sent back to the client 201 along with an endorsement signature, if approved. The client 201 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 201 initiates the transaction 291 by constructing and sending a request to the peer node 281, which is an endorser. The client 201 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 201, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 201 which parses the payload for the application to consume.

In response, the application of the client 201 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 201 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
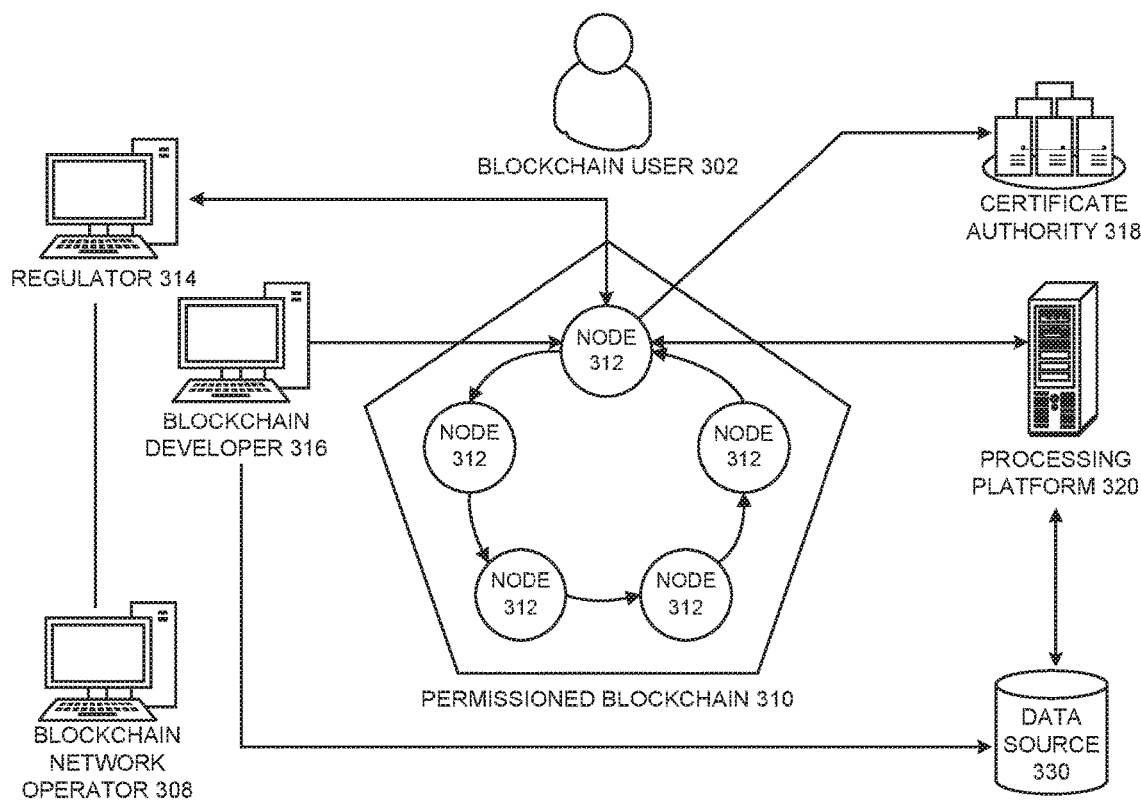
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system node 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
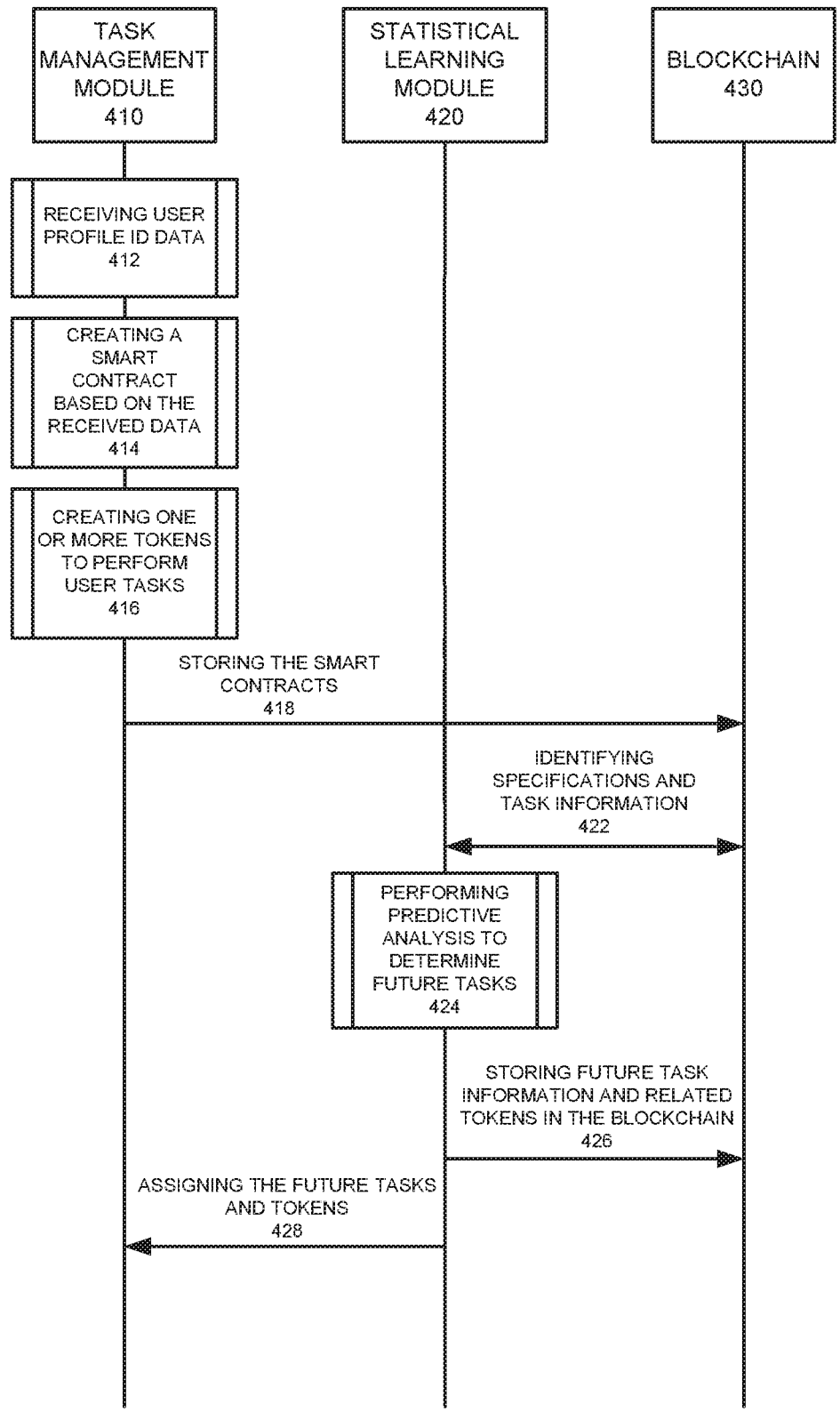
FIG. 4 illustrates a system messaging diagram for performing a blockchain task management configuration, according to example embodiments.

FIG. 4 illustrates a system messaging diagram for performing task management, according to example embodiments. Referring to FIG. 4, the system 400 provides a task management module 410, a statistical learning module 420 and a blockchain 430. The process may include receiving a user profile identifier 412, creating one or more smart contracts based on the received data 414, creating one or more tokens to perform the user tasks 416 and storing the related information 418 in the blockchain 430. The statistical learning module 420 may reference blockchain blocks to identify specifications for current and future tasks planning 422. The future tasks or new tasks may be created based on a predictive analysis 424. The future tasks may be stored along with necessary tokens 426 in the blockchain 430. The future tasks and tokens 428 may be assigned to the task management module to prepare for the user profile task access operations which are likely to occur at the predicted times.

Figure 5A:
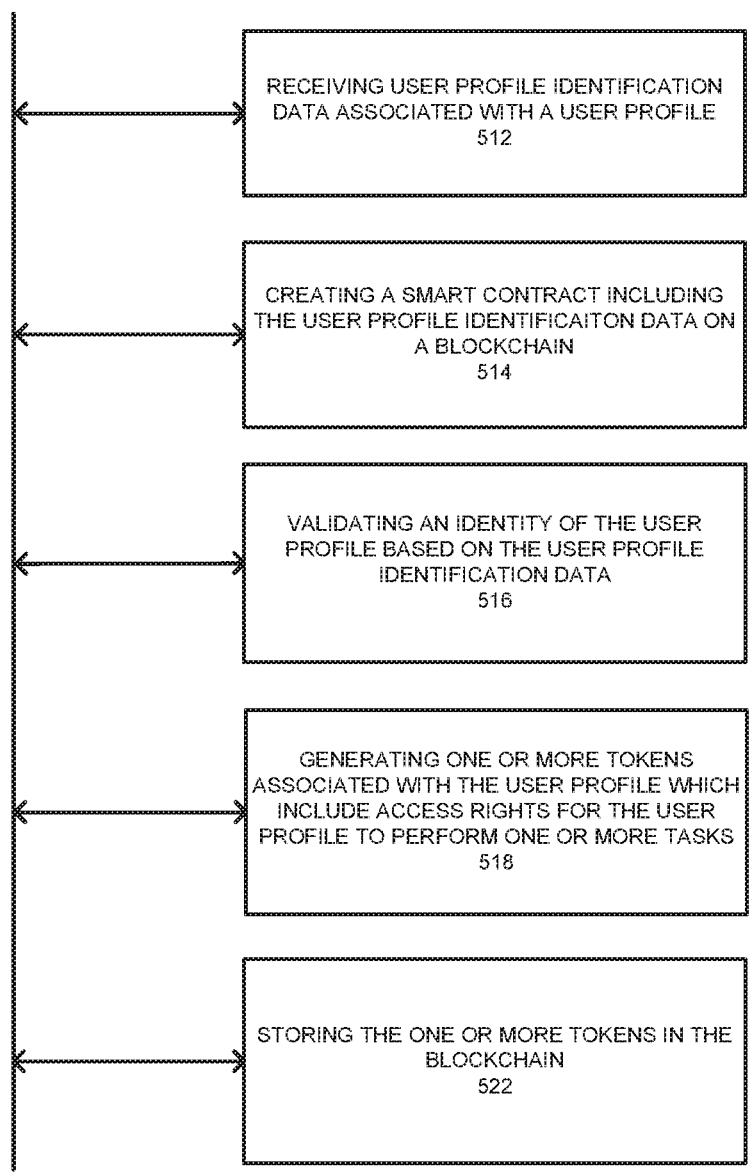
FIG. 5A illustrates a flow diagram of an example method of task management in a blockchain, according to example embodiments.

FIG. 5A illustrates a flow diagram of an example method of task management in a blockchain, according to example embodiments. Referring to FIG. 5A, the method 500A may include receiving user profile identification data associated with a user profile 512, creating a smart contract including the user profile identification data on a blockchain 514, validating an identity of the user profile based on the user profile identification data 516, generating one or more tokens associated with the user profile, wherein the one or more tokens comprise access rights for the user profile to perform one or more tasks 518, and storing the one or more tokens in the blockchain 522.

The method may also include performing a predictive analysis to determine future tasks to be performed by the user profile, where the predictive analysis includes a determination as to a likelihood of performing the future tasks based on one or more of previous tasks performed, user profile preferences, a recent user calendar event and user profile social media information. The future tasks are identified based on contextual information associated with the one or more tasks, and where the contextual information includes one or more of a recently identified location, a recently used device and the recent user calendar event. The method also includes identifying one or more of resources and subcontracts required for the future tasks, and selecting access control specifications from the blockchain required to access the resources and the subcontracts. The method also includes identifying one or more task and token pairs from the blockchain, and selecting the one or more task and token pairs based on an optimization objective associated with the one or more tasks. The method may also include applying the one or more task and token pairs to perform the one or more tasks, configuring one or more sensors as a service point associated with the one or more tasks, and storing the service point in the blockchain, verifying the one or more tokens at the service point by authenticating a device at the one or more sensors.

Figure 5B:
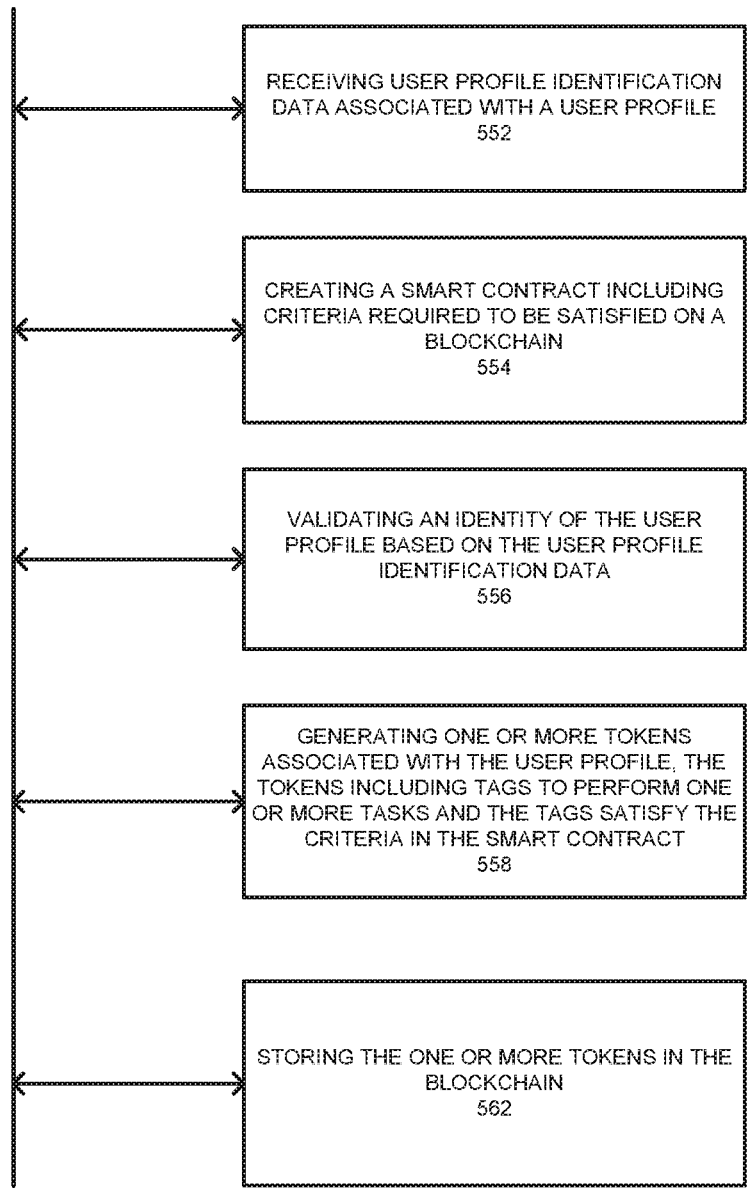
FIG. 5B illustrates a flow diagram of another example method of task management in a blockchain, according to example embodiments.

FIG. 5B illustrates a flow diagram of another example method of task management in a blockchain, according to example embodiments. The method 500B may provide receiving user profile identification data associated with a user profile 552, creating a smart contract including criteria required to be satisfied on a blockchain 554, validating an identity of the user profile based on the user profile identification data 556, generating one or more tokens associated with the user profile, the one or more tokens comprise tags to perform one or more tasks, and the tags satisfy the criteria in the smart contract 558, and storing the one or more tokens in the blockchain 562.

Figure 5C:
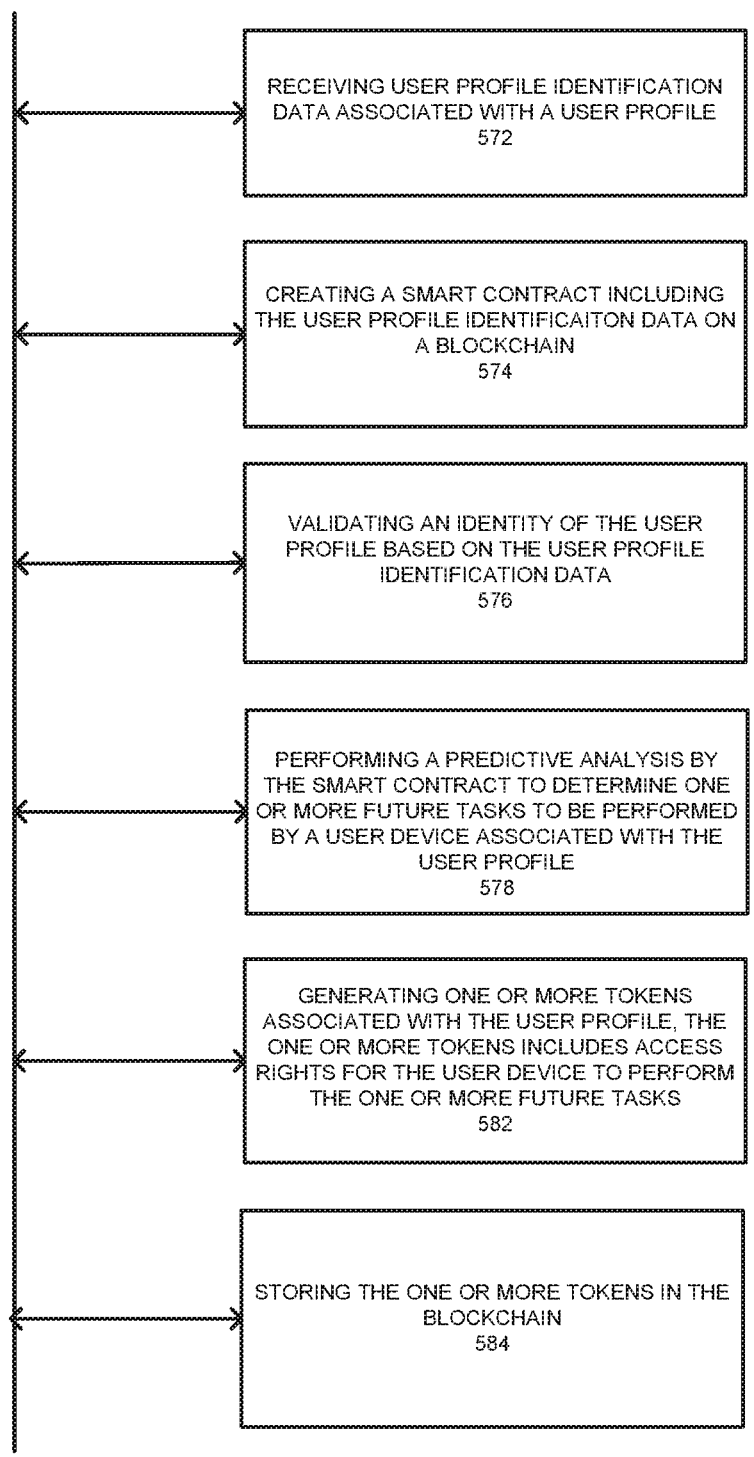
FIG. 5C illustrates a flow diagram of yet another example method of task management in a blockchain, according to example embodiments.

FIG. 5C illustrates a flow diagram of yet another example method of task management in a blockchain, according to example embodiments. The method 570 may include receiving user profile identification data associated with a user profile 572, creating a smart contract on a blockchain comprising the user profile identification data 574, validating an identity of the user profile based on the user profile identification data 576, performing a predictive analysis by the smart contract to determine one or more future tasks to be performed by a user device associated with the user profile 578, generating one or more tokens associated with the user profile, the one or more tokens include access rights for the user device to perform the one or more future tasks 582, storing the one or more tokens in the blockchain 584.

In addition to the tokens being generated and used by the user profile when performing the tasks, such as using authentication via a user device to enter a building or daycare facility, the tags may also be used to determine whether the criteria has been satisfied to enable the tokens. For example, the tags may provide a way to certify identity, prove a current status (i.e., active employee status) necessary to use the tokens to perform the tasks.

Figure 6A:
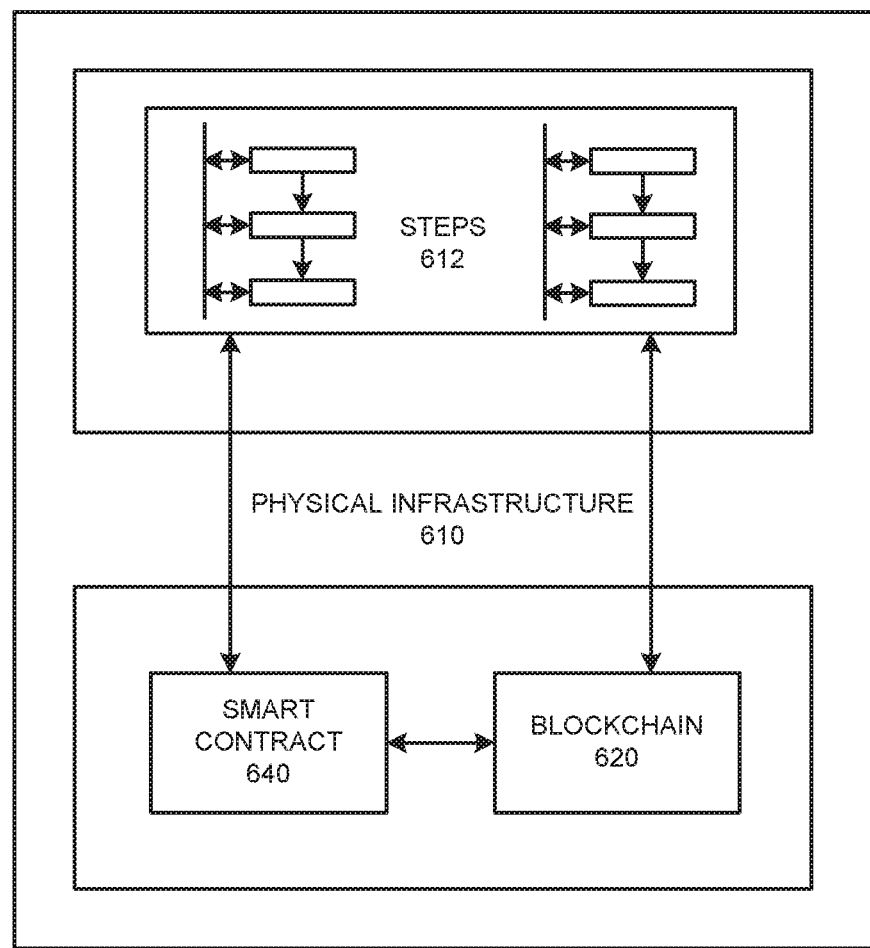
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
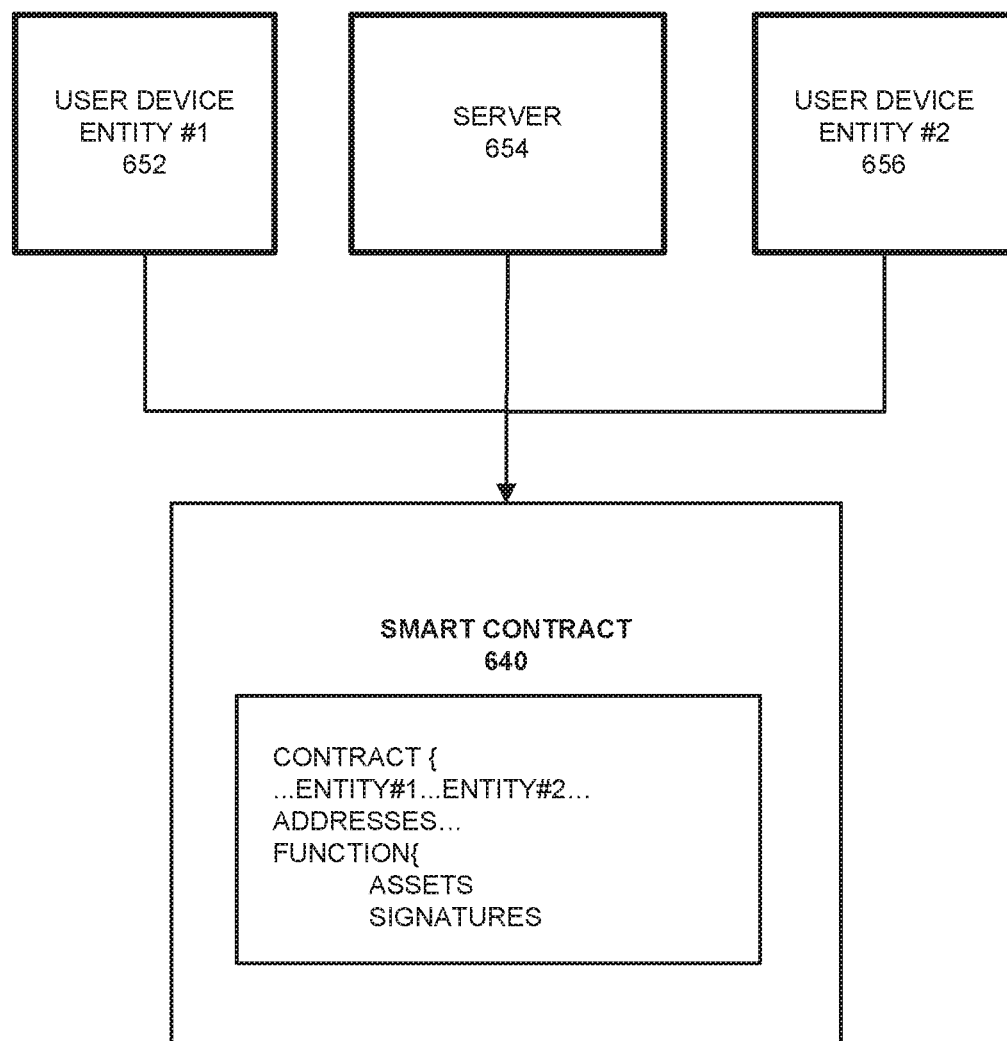
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 600B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
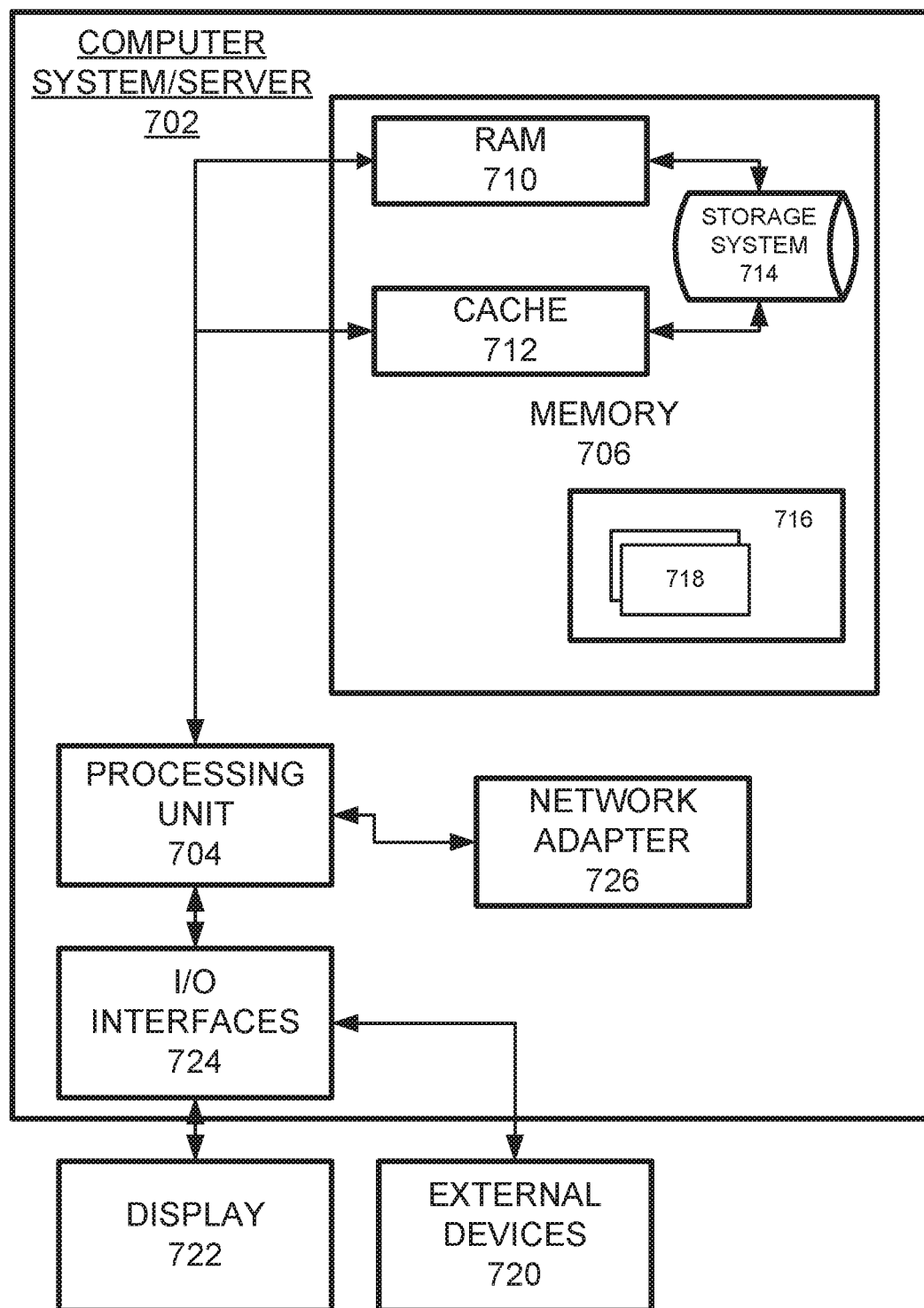
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD- ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed.

Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   identifying, by a processor of a statistical learning module, one or more future tasks to be performed by a user device associated with a user profile based on a predictive analysis of a smart contract stored in a blockchain, the smart contract comprising user profile identification data associated with the user profile;
   retrieving, by the processor of the statistical learning module, and from the blockchain, one or more of resources required to perform the one or more future tasks;
   identifying, by the processor of the statistical learning module, a situation in which the one or more resources are not available to perform the one or more future tasks;
   identifying, by the processor of the statistical learning module, one or more subcontracts associated with the smart contract, the one or more subcontracts specifying an alternative manner to perform the one or more future tasks;
   selecting, by the processor of the statistical learning module, and from the blockchain, access control specifications required to access the one or more resources and the one or more subcontracts;
   generating, by the processor of the statistical learning module, one or more tokens associated with the user profile, wherein the one or more tokens comprise access rights for the user device to perform the one or more future tasks; and
   sending, by the processor of the statistical learning module, the one or more future tasks and one or more tokens to the blockchain.

2. The method of claim 1, wherein the identifying the one or more future tasks to be performed further comprises:
   identifying the one or more future tasks based on a predictive analysis of one or more of:
      previous tasks identified, user profile preferences, a previous user calendar event, and user profile social media information.

3. The method of claim 1, wherein the identifying the one or more future tasks to be performed further comprises:
   identifying the one or more future tasks based on contextual information associated with a previously identified task, wherein the contextual information comprises one or more of:
      a previously identified location, a previous transaction performed by the user device, and a previous user calendar event.

4. The method of claim 1, further comprising:
   identifying one or more task and token pairs from the blockchain; and
   selecting the one or more task and token pairs based on an optimization objective associated with the one or more future tasks.

5. The method of claim 4, further comprising:
   applying the one or more task and token pairs to perform the one or more future tasks;
   configuring one or more sensors as a service point associated with the one or more future tasks; and
   storing service point data associated with the service point in the blockchain.

6. The method of claim 5, further comprising:
   verifying the one or more task and token pairs at the service point by authenticating the user device via the one or more sensors.

7. A system, comprising:
   a memory storing one or more instructions; and
   a hardware implemented computing node configured to execute the one or more instructions to:
      identify a one or more future tasks to be performed by a user device associated with a user profile based on a predictive analysis of a smart contract stored in a blockchain, the smart contract comprising user profile identification data associated with the user profile;
      retrieve one or more of resources required to perform the one or more future tasks from the blockchain;
      identify a situation in which the one or more resources are not available to perform the one or more future tasks;
      identify one or more subcontracts associated with the smart contract, the one or more subcontracts specifying an alternative manner to perform the one or more future tasks;
      select access control specifications required to access the one or more resources and the one or more subcontracts from the blockchain;
      generate one or more tokens associated with the user profile, wherein the one or more tokens comprise access rights for the user device to perform the one or more future tasks; and
      send the one or more future tasks and one or more tokens to the blockchain.

8. The system of claim 7, wherein, when the hardware implemented computing node is to identify the one or more future tasks, the hardware implemented computing node further is to:
   identify the one or more future tasks based on a predictive analysis of one or more of:
      previous tasks identified, user profile preferences, a previous user calendar event, and user profile social media information.

9. The system of claim 7, wherein, when the hardware implemented computing node is to identify the one or more future tasks, the hardware implemented computing node further is to:
   identify the one or more future tasks based on contextual information associated with a previously identified task, wherein the contextual information comprises one or more of:
      a previously identified location, a previous transaction performed by the user device, and a previous user calendar event.

10. The system of claim 7, wherein the hardware implemented computing node is further configured to:
    identify one or more task and token pairs from the blockchain; and
    select the one or more task and token pairs based on an optimization objective associated with the one or more future tasks.

11. The system of claim 10, wherein the hardware implemented computing node is further configured to:

apply the one or more task and token pairs to perform the one or more future tasks;
configure one or more sensors as a service point associated with the one or more future tasks, and
store service point data associated with the service point in the blockchain.

12. The system of claim 11, wherein the hardware implemented computing node is further configured to:
verify the one or more task and token pairs at the service point by authentication of the user device via the one or more sensors.

13. A non-transitory computer readable storage medium configured to store one or more instructions that when executed by a processor of a statistical learning module cause the processor to perform:
identifying one or more future tasks to be performed by a user device associated with a user profile based on a predictive analysis of a smart contract stored in a blockchain, the smart contract comprising user profile identification data associated with the user profile;
retrieving one or more of resources required to perform the one or more future tasks from the blockchain;
identifying, by the statistical learning module, a situation in which the one or more resources are not available to perform the one or more future tasks;
identifying, by the statistical learning module, one or more subcontracts associated with the one or more smart contracts, the subcontract specifying an alternative manner to perform the one or more future tasks;
selecting, by the statistical learning module, and from the blockchain, access control specifications required to access the one or more resources and the one or more subcontracts from the blockchain;
generating one or more tokens associated with the user profile, wherein the one or more tokens comprise access rights for the user device to perform the one or more future tasks; and
sending, by the statistical learning module, the one or more future tasks and one or more tokens to the blockchain.

14. The non-transitory computer readable storage medium of claim 13, wherein the identifying the one or more future tasks to be performed comprises:
identifying the one or more future tasks based on a predictive analysis of one or more of:
previous tasks identified, user profile preferences, a previous user calendar event, and user profile social media information.

15. The non-transitory computer readable storage medium of claim 13, wherein the identifying the one or more future tasks to be performed comprises:
identifying the one or more future tasks based on contextual information associated with a previously identified task, wherein the contextual information comprises one or more of:
a previously identified location, a previous transaction performed by the user device and a previous user calendar event.

16. The non-transitory computer readable storage medium of claim 13, the one or more instructions are further configured to cause the processor to perform:
identifying one or more task and token pairs from the blockchain; and
selecting, from the blockchain, access control specifications required to access the one or more resources and the subcontracts.

17. The non-transitory computer readable storage medium of claim 16, the one or more instructions are further configured to cause the processor to perform:
applying the one or more task and token pairs to perform the one or more future tasks;
configuring one or more sensors as a service point associated with the one or more future tasks;
storing service point data associated with the service point in the blockchain; and
verifying the one or more task and token pairs at the service point by authenticating a device via the one or more sensors.

* * * * *